Figure 5:
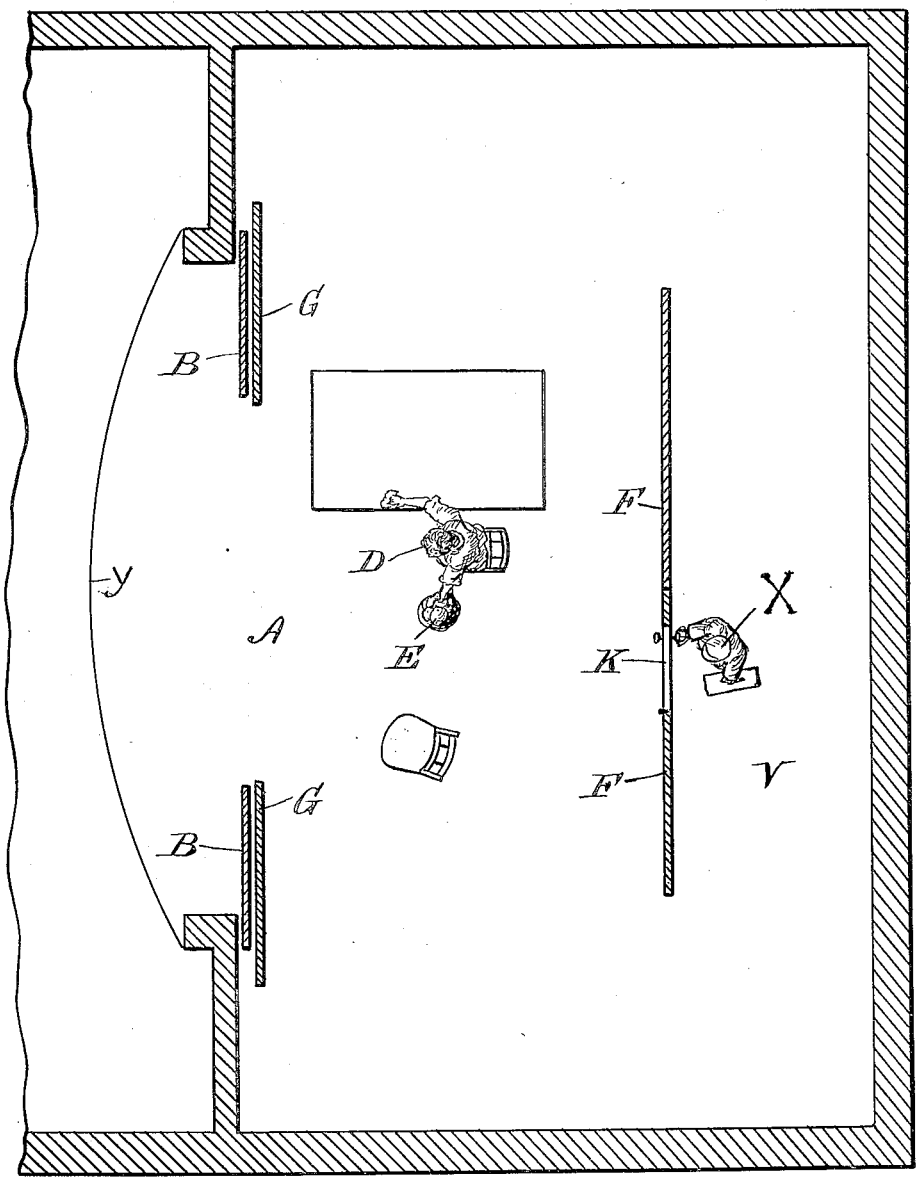

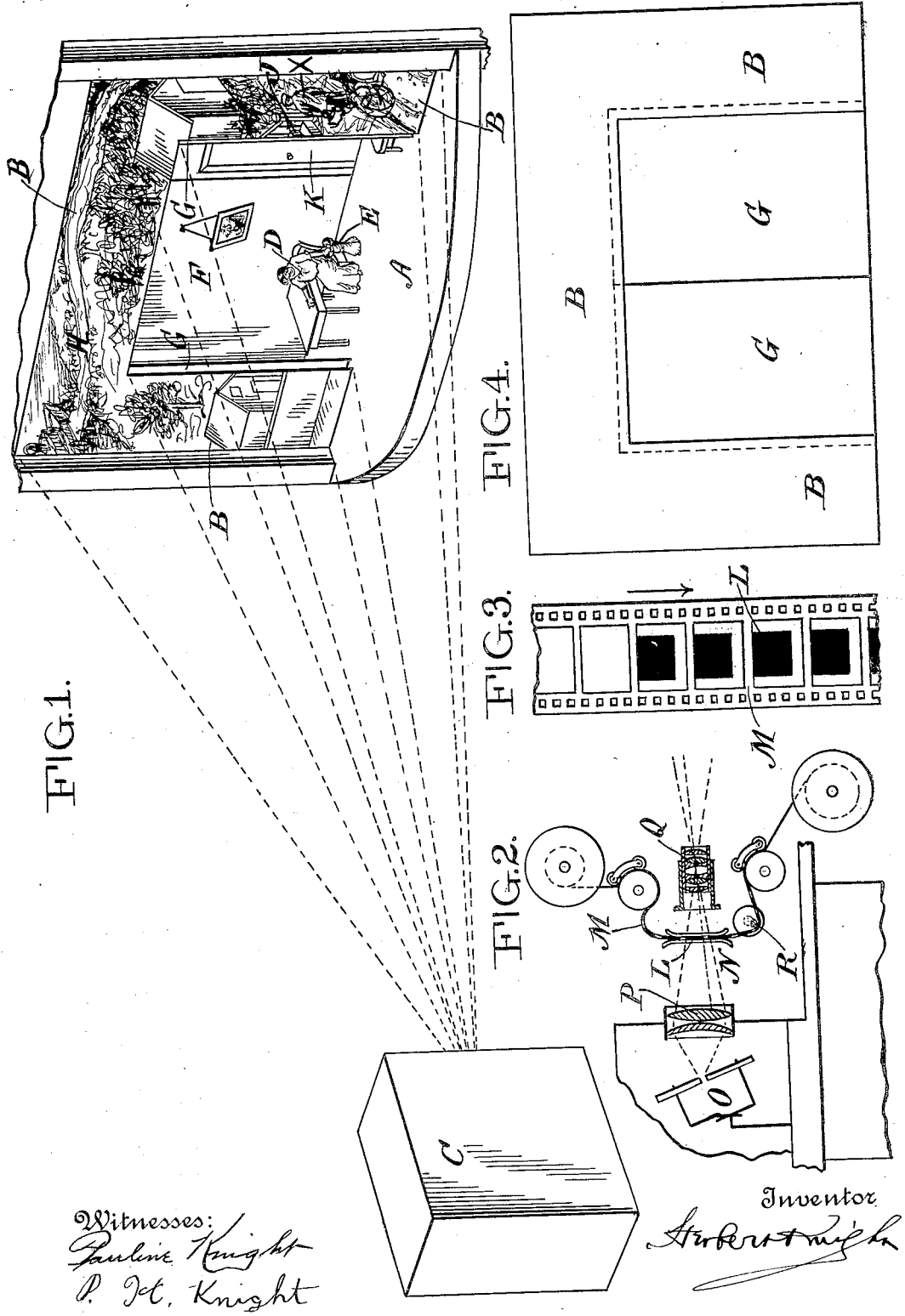

H. KNIGHT.
COMPOSITE DRAMATIC PRODUCTION.
APPLICATION FILED APR. 14, 1913.

1,102,595.

Patented July 7, 1914.
2 SHEETS—SHEET 2.

UNITED STATES PATENT OFFICE.

HERBERT KNIGHT, OF NEW YORK, N. Y.

COMPOSITE DRAMATIC PRODUCTION.

1,102,595.  Specification of Letters Patent.  Patented July 7, 1914.

Application filed April 14, 1913. Serial No. 760,847.

*To all whom it may concern:*

Be it known that I, HERBERT KNIGHT, a citizen of the United States of America, residing in the borough of Manhattan, city of New York, county and State of New York, have invented a new and useful Improvement in Composite Dramatic Productions, of which the following is a specification.

This invention relates to, and has for its object to produce what I term a composite dramatic production. By this phrase I designate a dramatic production which is partly carried on by living characters and real objects or accessories which latter preferably occupy a central panel, or middle part, of the production, and partly by accessory moving pictures preferably occupying the surrounding, adjacent, or outside panel or panels. This feat has never, to my knowledge, been contemplated or undertaken in connection with the dramatic art, in the presentation in fact of any play or stage scene. In its right and proper utilization it can be rendered immensely effective. A living character on leaving the stage can be immediately taken up and reappear in the picture, and as the action is continuous this not only does not detract from the interest in the performance, but on the contrary greatly enhances it. This action can, of course, be reversed.

In my invention I propose coördinating with the staged play or enacted dramatic scene the environing and accessory action which is, as stated, depicted on a contiguous or surrounding scene in the form of moving pictures. The action carried on in the associated moving picture assists in telling the story of the play, and as the pictures are immediately contiguous to the space occupied by the living performers, and as both scenes occupy but a single field of view, and furthermore as the joint and several actions tend to, and are in their best employment, directed toward a common climax, the story will be made plainer and the interest correspondingly heightened.

I will explain my invention in connection with the accompanying drawing which forms a part of this specification.

In Figure 1 I show a moving picture apparatus, a stage and proscenium and two coördinating scenes. In the central panel is the customary stage upon which is presented the scene, such as an interior, being enacted and occupied by living characters and real objects or accessories. Upon the surrounding panel B is displayed a moving picture portraying events in neighboring localities, such as an exterior view related to the interior shown on the stage, but which events are occurring at the same time as those being enacted on the stage or central panel, the actions in both the panels being interrelated: both bearing in fact upon or tending toward a common climax. As I have shown it, the moving picture discloses a scene which not only coördinates with the action in the central panel but which, as the drama progresses, is consistent and merges with the action of the enacted scene. By merging I mean the gradual drawing toward the central enacted scene one or more of the characters in the moving picture, and so timing its action that, as the character in question appears to be entering upon the stage panel, a living performer similar in appearance in every way to the picture performer can enter from the wings at the same instant and continue, in living form, to enact the part of the picture performer, time, position, movement and appearance being nicely studied and carried out to create the intended illusion. This operation can, of course, be reversed with equally good results—the living actor quitting the stage being immediately taken up or reappearing in the picture, and his movements continued to any desired point. While I have shown the central panel or stage employed to represent an interior scene to be occupied by the living characters and accessories, with the outer panel employed for the related pictured exterior scene, it will be understood that in some instances this relation may be reversed with good effect. In Fig. 2 of the drawings, I show the picture projecting apparatus in vertical longitudinal section. Fig. 3 shows a detail view of the film which I employ in connection with this invention to produce the composite dramatic production described and illustrated in Fig. 1. In Fig. 4 I show how wings G, G, are brought together to form with B, B, a continuous screen in connection with the surrounding scene. Fig. 5 is a plan view partly in section.

In these drawings the stage for the living performers is shown centrally located, as at A. Partly surrounding this is the screen B, and upon this screen I project moving pictures by means of the lantern C. The living performers are shown upon the stage at D, E. The back of the stage is shown at F, the wings at G. The screen B affords a means for showing an extensive scene, and of projecting thereon, by means of moving pictures, a part of the story being told by the play. Obviously the screen B need not surround the stage A, but may be adjacent one side thereof only, or one side and the top. The living characters are represented as awaiting the return of some person. In the distance and at the upper left hand corner is shown a sheet of water with a boat approaching a landing. People disembark and enter an automobile, which drives along a road H. It finally approaches the side picture entrance J. The character which D and E are expecting jumps from the automobile as it nears J and disappears in the picture entrance, and immediately thereupon this character X, in living form, enters on the stage A through the door K. This door and the vestibule V, which exits between it and the entrance J in the moving picture, are important: and the vestibule as here created constitutes an entirely new feature in theatrical porduction, to wit; a space between a pictured entrance and a real entrance, to provide for the temporary disappearance of the actor while passing from a pictured representation to a living character, or vice versa. In the plan view shown in Fig. 5, the vestibule V is indicated in rear of the back F of the stage panel A.

Referring to Figs. 2 and 3 an opaque part L is shown on the film M which latter passes through the gate N; the light from the lamp O passing through the condenser P is brought to a partial focus as it passes through the gate N, and thence through the objective Q; the film M is given an intermittent movement by means of the dog R in the apparatus of well known construction.

In Fig. 4 I show the wings closed; this will provide a continuous screen and I can then carry on the story of the play by a single set of moving pictures over the entire screen; in such a case I would use films without any opaque parts; in this manner and by carrying into effect such a method I can link act to act disclosing the movements and history of the actors in the interim.

In Fig. 3 I show at the bottom films with darkened or opaque portions to work in connection with the scheme shown in Fig. 1; in the upper part of Fig. 3 I show films of the ordinary kind to work in connection with the plan shown in Fig. 4. The darkened or opaque portions of the film are seen centrally located in each single picture section of the film to correspond with the central location of stage A. If the stage A were located to one side of the composite scene the darkened or opaque portion of film would be correspondingly located, as will be understood.

I will proceed to describe Fig. 5 in connection with Fig. 1; Fig. 5 is a plan view of a stage with some of the accessories shown in horizontal section. The characters which are shown in Fig. 1 appear in Fig. 5. The character X in the form of a picture is moving along the panel B (see Fig. 1) and toward the central panel A, or the fixed stage dramatic scene; the spectators are seated in the front, that is to the left, of Fig. 5. The line Y is the front edge of the stage, or footlight line, and the eye of the spectator is directed to the panel B at the spectator's right of the proscenium. It is across this, or down this panel B, that the picture character X is moving. Just before he reaches the inner edge of the screen or panel B he disappears into the picture entrance J. The eye of the spectator continues for a moment to drift still further in the same direction and has about reached the point at the back of the stage where the real entrance K is located, when the character X, in living form and being preferably the same person from which the moving picture was taken, enters upon the central stage through said entrance K. If any one skilled in the art to which this invention relates will view Fig. 5 of the drawings in the manner indicated, he will easily discern and readily comprehend the movements and transformation described. He will see that as the character X in the picture moves along as above explained there is a momentary obliteration when it reaches the inner edge of the panel B; the eye being slow, and the judgment or expectancy waiting upon the eye, the spectator will continue to transport the picture character X and will house it, in his imagination, in this momentary space of time, somewhere between the panel B and the door K before it reappears in living form entering through the latter. This imaginary space I have indicated at V; I refer to this space for convenience as a vestibule. It will be made plain if Fig. 5 is viewed as the spectators view it—that is, from the left-hand side, the eye being directed over the footlights in a straight line toward the back of the stage. This vestibule, where the spectator, in his mind's eye, momentarily places the actor while in transit from the image to the actual, or reversing this, from the real to the picture character, is new in the dramatic art, but its existence, as an imaginary point, is essential in order to create the described illusion.

A composite drama is here created in which propinquity or continuity of the zones provides for natural and easy transition from one to the other; the said zones or fields being however physically distinct and separate entities bringing in an agency for indefinite lateral extensions to the stage setting by means of the environing moving pictures, and affording that hitherto unaccomplished spectacle of characters participating in the speaking drama advancing toward, or receding from, the central stage setting in picture form and in true perspective. It will be seen and understood that the translation or transition from the real character to the picture character though occupying a measurable space of time is practically instantaneous and that the time actually occupied is the same as is required for the eye of the spectator to move from the real to the picture entrance, or vice versa, and at the speed with which the character has been moving. It will also be seen that I have shown means for displaying that continuity of movement for the character in question; all the time and action of said character in undergoing this transference and translation being accounted for; this is very desirable as it holds the attention of the spectator more completely and heightens the effect correspondingly; these phases and advantages are mentioned in the introductory part of this specification; this immediate translation, transition, or transference of the living character into the picture character, or vice versa, in the manner and by the method described creates in the mind and to the eye of the spectator an illusion much more pleasing, satisfactory and surprising than where a sensible time elapses between the disappearance and the reappearance, and the physical space between the points of disappearance and reappearance is unaccounted for; this effect is again strengthened and improved when the real and picture scenery or properties are continuations one of the other.

It will be noted that I create and employ two distinct zones for carrying my invention into effect; one zone being the stage with its setting and the other being the screen on which I project the correlating moving pictures, and that both zones together form a single field of view, that is to say the spectator sees them both at the same time and it is in this sense that I employ the phrase "single field of view." It will be seen also that I limit the picture presentation to the screen and the performance enacted by living actors to the stage, neither field of portrayal obstructing or occluding the other. The two zones of activity are thus during the presentation of any spectacle kept separate; the objective or physical scenes are confined to the stage proper and the pictures to the screens.

Wherever in the specification and claims I speak of the two dramatic scenes being physically distinct I mean that they are kept separate the one from the other; that is to say neither obscures nor obliterates the other; the zone of the stage setting is reserved for the living characters and the zone or field of the moving pictures is confined to the screens arranged therefor; the moving picture does not move into the scene where the living actors are performing and on the other hand the living characters do not move in front of the screen upon which moving pictures are being projected so as to obliterate the picture at such points.

I claim the following—

1. The art of simultaneously displaying on the stage of a theater two correlating scenes one of which is a moving picture spectacle projected upon a suitable screen and the other a physical scene, which scenes are continuous one with the other, each being the lateral extension of the other, and limiting each scene to its own field of display.

2. The art of producing a composite drama in conjunction with a stage setting and a screen both of which are placed within the proscenium of a theater, which consists in displaying therein two independently and simultaneously illuminated coordinating dramatic activities, both visible to the spectator and embraced in a single field of view side by side but not intruding one upon the other, one of said scenes being a moving picture spectacle, and the other an enacted scene portrayed by living characters in the stage setting.

3. The art of producing a composite drama in conjunction with a stage setting and a screen both of which are placed within the proscenium of a theater, which consists in displaying therein two independently and simultaneously illuminated coordinating dramatic activities, both visible to the spectator and embraced in a single field of view side by side but not intruding one upon the other, one of said scenes being a moving picture spectacle, and the other an enacted scene portrayed by living characters in the stage setting, and translating characters from the moving picture scene to the living and vice versa.

4. The art of producing a composite theatrical representation which consists in displaying in a single field of view an enacted scene performed by living characters in a stage setting, extending the scene laterally by projecting upon a contiguous screen a correlating picture, whereby the adjoining scenes are continuous one with the other and transferring and translating characters by an apparent continuity of movement from the real to the picture scene, or vice versa.

5. The art of producing in a single field of view two contiguous dramatic scenes, one of which is a moving picture scene, and the other a living scene, which consists in translating characters from the moving picture to the living scene, and vice versa, 6. The art of producing a composite dramatic representation, which consists in simultaneously producing in a single field of view a moving picture scene and an enacted scene performed by living or real characters and objects and causing said characters or objects to pass from the enacted scene and re-appear pictorially in the pictured scene, and vice versa, with a continuity of dramatic incident or action, and through visible and corresponding real and picture exits and entrances.

7. The art of producing coöperating dramatic scenes one of said scenes being enacted by living characters and the other consisting of moving pictures, which consists in translating a character from the moving picture to the living scene, or vice versa, through the medium of a vestibule between real and picture exits in the respective scenes.

8. The art of producing a composite theatrical representation which consists in displaying in a single field of view an enacted portrayal by living characters in an interior scene, and projecting upon a suitable screen a series of moving pictures depicting an exterior scene correlating with the interior scene.

9. The art of producing a composite theatrical representation which consists in displaying in a single field of view an enacted portrayal by living characters in an interior scene showing an entrance, simultaneously projecting upon a suitable screen a series of moving pictures and causing a living character to pass from the stage through a real entrance and re-appear in picture form through a corresponding picture entrance in the exterior, or vice versa, to cause a picture character as it leaves the moving exterior picture to pass through a picture entrance and to enter in living form through the corresponding real entrance on the stage.

In testimony whereof, I have signed my name to this specification in the presence of two subscribing witnesses, this 11th day of April 1913.

HERBERT KNIGHT.

Witnesses:
  DOROTHY LUSTICK,
  MAURICE BLOCH.